United States Patent
Carmel et al.

(10) Patent No.: US 10,003,799 B2
(45) Date of Patent: Jun. 19, 2018

(54) QUALITY DRIVEN VIDEO RE-ENCODING

(71) Applicant: BEAMR IMAGING LTD, Tel-Aviv (IL)

(72) Inventors: Sharon Carmel, Ramat Hasharon (IL); Dror Gill, Haifa (IL); Tamar Shoham, Netanya (IL)

(73) Assignee: BEAMR IMAGING LTD, Tel-Aviv (IL)

( * ) Notice: Subject to any disclaimer, the term of this patent is extended or adjusted under 35 U.S.C. 154(b) by 0 days. days.

(21) Appl. No.: 14/912,291

(22) PCT Filed: Aug. 11, 2014

(86) PCT No.: PCT/IL2014/050723
§ 371 (c)(1),
(2) Date: Feb. 16, 2016

(87) PCT Pub. No.: WO2015/022685
PCT Pub. Date: Feb. 19, 2015

(65) Prior Publication Data
US 2016/0205407 A1    Jul. 14, 2016

Related U.S. Application Data

(60) Provisional application No. 61/865,318, filed on Aug. 13, 2013.

(51) Int. Cl.
*H04N 19/40*    (2014.01)
*H04N 19/124*   (2014.01)
(Continued)

(52) U.S. Cl.
CPC ......... *H04N 19/124* (2014.11); *H04N 19/147* (2014.11); *H04N 19/15* (2014.11);
(Continued)

(58) Field of Classification Search
None
See application file for complete search history.

(56) References Cited

U.S. PATENT DOCUMENTS 5,819,004 A    10/1998   Azadegan et al.
6,483,945 B1   11/2002   Kato
(Continued)

FOREIGN PATENT DOCUMENTS

WO    2013/030833    3/2013

OTHER PUBLICATIONS

Bulla, et al., Realtime Object Detection & Tracking for ROI Encoding, In International Workshop on Acoustic Signal Enhancement IWAENC'12, 2012, p. 1.
(Continued)

*Primary Examiner* — Kevin Mcinnish
(74) *Attorney, Agent, or Firm* — Browdy and Neimark, PLLC

(57) ABSTRACT

A method including obtaining a first plurality of decode-independent segments corresponding to an original video bit-stream, re-encoding each one of the first plurality of decode-independent segments according to a quality criterion, giving rise to a second plurality of decode-independent segments; and generating an output video bitstream including a third plurality of decode-independent segments, wherein each segment in the third plurality of decode-independent segments is selected from either the first plurality of decode-independent segments or from the second plurality of decode-independent segments using a selection criterion that is related at least to a segment's bit-rate.

18 Claims, 7 Drawing Sheets

(51) Int. Cl.
*H04N 19/147* (2014.01)
*H04N 19/15* (2014.01)
*H04N 19/177* (2014.01)
*H04N 19/194* (2014.01)

(52) U.S. Cl.
CPC ......... *H04N 19/177* (2014.11); *H04N 19/194* (2014.11); *H04N 19/40* (2014.11)

(56) References Cited

U.S. PATENT DOCUMENTS

| | | | |
|---|---|---|---|
| 6,885,703 | B1 | 4/2005 | Funaya et al. |
| 8,199,810 | B2 | 6/2012 | Mabey et al. |
| 2006/0018378 | A1 | 1/2006 | Piccinelli et al. |
| 2009/0279605 | A1* | 11/2009 | Holcomb ............. H04N 19/147 375/240.03 |
| 2010/0061446 | A1* | 3/2010 | Hands ................. H04N 19/196 375/240.02 |
| 2010/0118982 | A1 | 5/2010 | Chatterjee et al. |
| 2010/0296580 | A1* | 11/2010 | Metoevi ........... H04N 19/00472 375/240.16 |
| 2011/0060792 | A1 | 3/2011 | Ebersviller |
| 2011/0292996 | A1 | 12/2011 | Jayant et al. |
| 2012/0275512 | A1 | 11/2012 | Bouton et al. |
| 2013/0077675 | A1* | 3/2013 | Rosen .................... H04N 19/15 375/240.03 |
| 2013/0202031 | A1 | 8/2013 | Tripathi et al. |

OTHER PUBLICATIONS

Ferreira, et al., H.264/SVC ROI Encoding with Spatial Scalability, International Conference on Signal Processing and Multimedia Applications, 2008, pp. 1-4.

Gu, et al., Region of interest weighted pooling strategy for video quality metric, Telecommunication Systems, 2012, pp. 63-73, vol. 49, issue 1.

Osberger, et al., An MPEG Encoder Incorporating Perceptually Based Quantisation, TENCON'97. IEEE Region 10 Annual Conference, Speech and Image Technologies for Computing and Telecommunications, Proceedings of IEEE, 1997, pp. 1-5, vol. 2.

Seshadrinathan, et al., Motion Tuned Spatio-Temporal Quality Assessment of Natural Videos, IEEE Transactions on Image Processing, Feb. 2010, pp. 335-350, vol. 19, No. 2.

Soyak, et al., Content-Aware H.264 Encoding for Traffic Video Tracking Applications, 2010 IEEE International Conference on Acoustics, Speech and Signal Processing, 2010, pp. 1-4.

Wang, et al., Image Quality Assessment: From Error Visibility to Structural Similarity, IEEE Transactions on Image Processing, Apr. 2004, pp. 1-14, vol. 13, No. 4.

Wang, et al., Spatial Pooling Strategies for Perceptual Image Quality Assessment, IEEE Inter. Conf. Image Proc., Oct. 8-11, 2006, pp. 1-4.

* cited by examiner

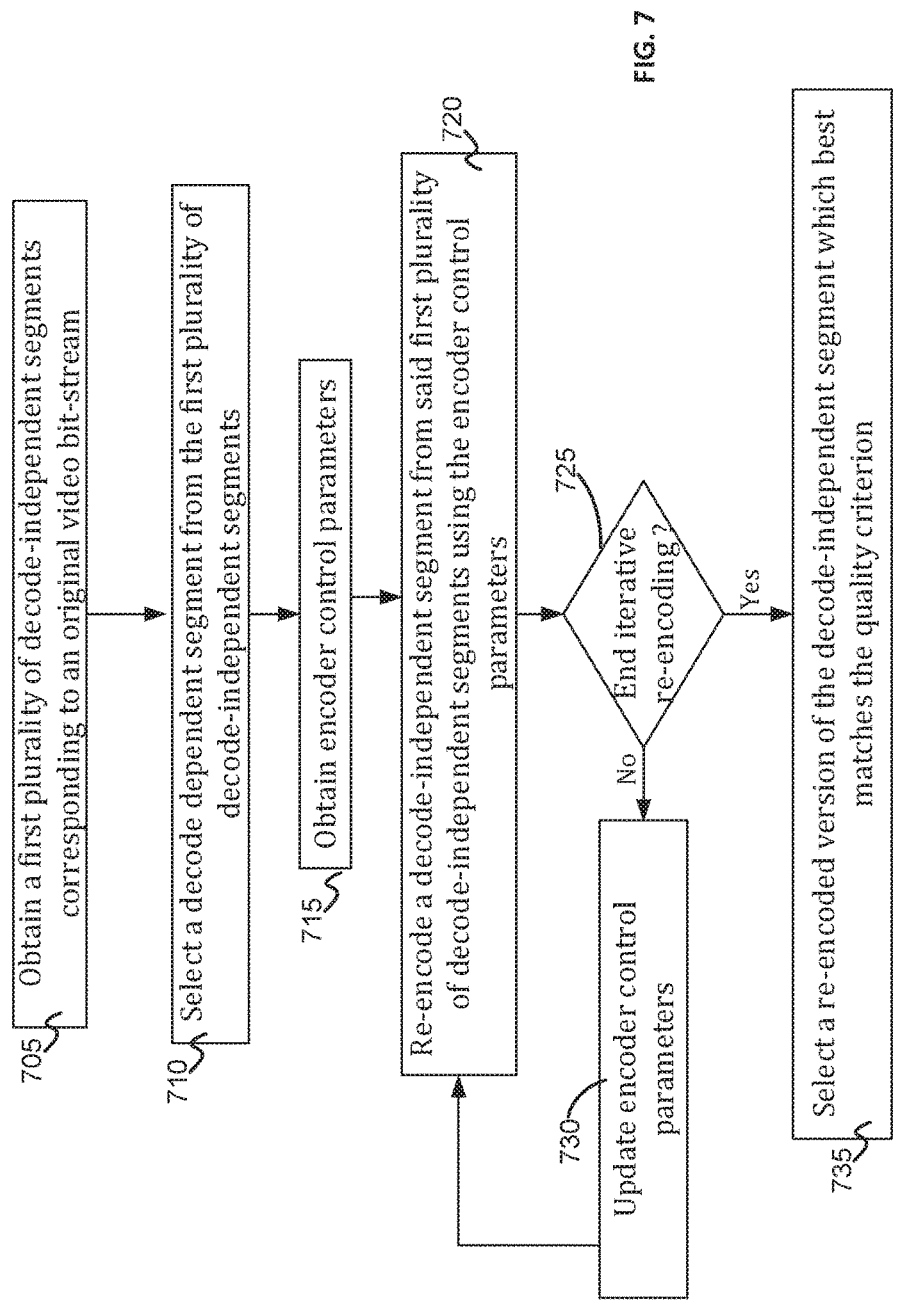

QUALITY DRIVEN VIDEO RE-ENCODING

FIELD OF THE INVENTION

The present invention is in the field of video processing and relates to video re-encoding.

SUMMARY

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on a tangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operational data can be used by a presently disclosed component(s). By way of example, such operational data can be stored on a tangible computer readable medium. The operational data can be a single data set, or it can be an aggregation of data stored at different locations, on different network nodes or on different storage devices.

According to an aspect of the presently disclosed subject matter, there is provided a method comprising: obtaining a first plurality of decode-independent segments corresponding to an original video bit-stream; re-encoding each one of the first plurality of decode-independent segments according to a quality criterion, giving rise to a second plurality of decode-independent segments; and generating an output video bitstream comprising a third plurality of decode-independent segments, wherein each segment in the third plurality of decode-independent segments is selected from either the first plurality of decode-independent segments or from the second plurality of decode-independent segments using a selection criterion that is related at least to a segment's bit-rate.

According to an example of the presently disclosed subject matter, there is further provided a method, wherein the first plurality of decode independent segments is a plurality of original decode-independent segments.

According to an example of the presently disclosed subject matter, there is yet further provided a method, wherein the output video bitstream includes one or more decode-independent segments from the original video bit-stream and one or more segments from the second plurality of decode-independent segments.

According to an example of the presently disclosed subject matter, there is yet further provided a method, wherein the first plurality of decode-independent segments is obtained by re-encoding each one of a plurality of original decode-independent segments from the original video bit-stream to a target bit-rate.

According to an example of the presently disclosed subject matter, there is yet further provided a method, wherein re-encoding each one of the first plurality of decode-independent segments, comprises re-encoding a decode-independent segment from the first plurality of decode-independent segments according to a plurality of different re-encoded versions, each using different encoder control parameters, giving rise to a plurality of re-encoded versions of the decode-independent segment; and selecting from the plurality of re-encoded versions of the decode-independent segment a version of the decode-independent segment which best matches the quality criterion.

According to an example of the presently disclosed subject matter, there is yet further provided a method, wherein the quality criterion sets a target quality, and wherein selecting from the plurality of re-encoded versions of the decode-independent segment a version of the decode-independent segment, comprises selecting from the plurality of re-encoded versions of the decode-independent segment a version of the decode-independent segment which is closest to the target quality.

According to an example of the presently disclosed subject matter, there is yet further provided a method, wherein the quality criterion sets a quality threshold, and wherein selecting from the plurality of re-encoded versions of the decode-independent segment a version of the decode-independent segment, comprises selecting from the plurality of re-encoded versions of the decode-independent segment a version of the decode-independent segment which is associated with a quality value that is above the quality threshold and whose bit-rate is a lowest among the plurality of re-encoded versions of the decode-independent segment.

According to an example of the presently disclosed subject matter, there is yet further provided a method, wherein the quality criterion is further associated with a bit-rate threshold, and wherein selecting from the plurality of re-encoded versions of the decode-independent segment a version of the decode-independent segment, comprises selecting from the plurality of re-encoded versions of the decode-independent segment a version of the decode-independent segment whose quality value is a highest among the plurality of re-encoded versions of the decode-independent segment whose bit-rate is below the bit-rate threshold.

According to an example of the presently disclosed subject matter, there is yet further provided a method, wherein re-encoding each one of the first plurality of decode-independent segments, comprises re-encoding a decode-independent segment from the first plurality of decode-independent segments, giving rise to a first re-encoded version of the decode-independent segment; and if a first re-encoded version of the decode-independent segment meets the quality criterion, including the first re-encoded version of the decode-independent segment in the second plurality of decode-independent segments, otherwise, re-encoding the decode-independent segment one or more additional times using respective, different, one or more encoder control parameters, giving rise to one or more additional re-encoded versions of the decode-independent segment, until one of the one or more additional re-encoded versions of the decode-independent segment meets the quality criterion or until a limit provided by a process control criterion is reached.

According to an example of the presently disclosed subject matter, there is yet further provided a method, wherein re-encoding a decode-independent segment from the first plurality of decode-independent segments, includes for a first version of a decode-independent segment from the first plurality of decode-independent segments using encoder control parameters that were used to re-encode a previous decode-independent segment from the first plurality of decode-independent segments.

According to an example of the presently disclosed subject matter, there is yet further provided a method, wherein each one of a plurality of original decode-independent segments from the original video bit-stream, each one of the second plurality of decode-independent segments and each one of the third plurality of decode-independent segments, is a H.264 Group of Pictures.

According to an aspect of the presently disclosed subject matter, there is yet further provided a method, comprising: re-encoding each one of a plurality of original decode-independent segments according to a bit-rate criterion, giving rise to a first plurality of decode-independent segments; separately re-encoding each one of the plurality of original decode-independent segments according to a quality criterion, giving rise to a second plurality of decode-independent segments; generating an output video bitstream comprising a third plurality of decode-independent segments, wherein each segment in the third plurality of decode-independent segments is selected from either the first plurality of decode-independent segments or from the second plurality of decode-independent segments using a selection criterion that is related at least to a segment's bit-rate.

According to an example of the presently disclosed subject matter, there is yet further provided a method, wherein the output video bitstream includes one or more decode-independent segments from the first plurality of decode-independent segments and one or more segments from the second plurality of decode-independent segments.

According to an example of the presently disclosed subject matter, there is yet further provided a method, wherein re-encoding each one of the plurality of original decode-independent segments according to a bit-rate criterion, comprises re-encoding a decode-independent segment from the plurality of original decode-independent segments according to a plurality of different encoder control parameters, giving rise to a first plurality of re-encoded versions of the decode-independent segment; selecting from the first plurality of re-encoded versions of the decode-independent segment a version of the decode-independent segment which best matches the bit-rate criterion, and wherein re-encoding each one of the plurality of original decode-independent segments according to a quality criterion, comprises re-encoding a decode-independent segment from the plurality of original decode-independent segments according to a plurality of different encoder control parameters, giving rise to a second plurality of re-encoded versions of the decode-independent segment; and selecting from the second plurality of re-encoded versions of the decode-independent segment a version of the decode-independent segment which best matches the quality criterion.

According to an aspect of the presently disclosed subject matter, there is yet further provided an apparatus, comprising: a decoder capable of decoding a first plurality of decode-independent segments corresponding to an original video bit-stream; an encoder capable of re-encoding each one of the first plurality of decode-independent segments according to a quality criterion, giving rise to a second plurality of decode-independent segments; an output bitstream generator capable of generating an output video bitstream comprising a third plurality of decode-independent segments, wherein each segment in the third plurality of decode-independent segments is selected from either the first plurality of decode-independent segments or from the second plurality of decode-independent segments using a selection criterion that is related at least to a segment's bit-rate.

According to an example of the presently disclosed subject matter, there is yet further provided an apparatus, wherein the buffer is further capable of temporarily storing the second plurality of decode independent segments.

According to an example of the presently disclosed subject matter, there is yet further provided an apparatus, wherein the first plurality of decode independent segments is a plurality of original decode-independent segments.

According to an example of the presently disclosed subject matter, there is yet further provided an apparatus, wherein the output video bitstream includes one or more decode-independent segments from the original video bit-stream and one or more segments from the second plurality of decode-independent segments.

According to an example of the presently disclosed subject matter, there is yet further provided an apparatus, wherein the decoder is configured to decode a plurality of original decode-independent segments, and wherein the encoder is capable of re-encoding each one of the original decode-independent segments according to a bit-rate criterion, giving rise to the first plurality of decode-independent segments.

According to an example of the presently disclosed subject matter, there is yet further provided an apparatus, wherein the encoder is capable of re-encoding each one of the first plurality of decode-independent segments, and wherein re-encoding each one of the first plurality of decode-independent segments, comprises re-encoding a decode-independent segment from the first plurality of decode-independent segments according to a plurality of different encoder control parameters, giving rise to a plurality of re-encoded versions of the decode-independent segment; and selecting from the plurality of re-encoded versions of the decode-independent segment a version of the decode-independent segment which best matches the quality criterion.

According to an example of the presently disclosed subject matter, there is yet further provided an apparatus, wherein the quality criterion sets a target quality, and wherein the encoder is capable of selecting from the plurality of re-encoded versions of the decode-independent segment a version of the decode-independent segment which is closest to the target quality.

According to an example of the presently disclosed subject matter, there is yet further provided an apparatus, wherein the quality criterion sets a quality threshold, and wherein the encoder is capable of selecting from the plurality of re-encoded versions of the decode-independent segment a version of the decode-independent segment whose bit-rate is lowest among a plurality of re-encoded versions of the decode-independent segment whose quality value is above the quality threshold.

According to an example of the presently disclosed subject matter, there is yet further provided an apparatus, wherein the quality criterion is further associated with a bit-rate threshold, and wherein the encoder is capable of selecting from the plurality of re-encoded versions of the decode-independent segment a version of the decode-independent segment whose quality value is a highest among the plurality of re-encoded versions of the decode-independent segment whose bit-rate is below the bit-rate threshold.

According to an example of the presently disclosed subject matter, there is yet further provided an apparatus, wherein the encoder is capable of re-encoding each one of the first plurality of decode-independent segments, by re-encoding a decode-independent segment from the first plurality of decode-independent segments, giving rise to a first re-encoded version of the decode-independent segment; and if a first re-encoded version of the decode-independent segment meets the quality criterion, the encoder is capable of including the first re-encoded version of the decode-independent segment in the second plurality of decode-independent segments, otherwise the encoder is capable of re-encoding the decode-independent segment one or more additional times using respective, different, one or more encoder control parameters, giving rise to one or more additional re-encoded versions of the decode-independent segment, until one of the one or more additional re-encoded versions of the decode-independent segment meets the quality criterion.

According to an example of the presently disclosed subject matter, there is yet further provided an apparatus, for a first version of a decode-independent segment from the first plurality of decode-independent segments the encoder is capable of using encoder control parameters that were used to re-encode a previous decode-independent segment from the first plurality of decode-independent segments.

According to an aspect of the presently disclosed subject matter, there is yet further provided an apparatus, comprising a decoder capable of decoding a plurality of original decode-independent segments corresponding to an original video bit-stream; an encoder capable of re-encoding each one of the plurality of original decode-independent segments according to a bit-rate criterion, giving rise to a first plurality of decode-independent segments; the encoder is capable of separately re-encoding each one of the plurality of original decode-independent segments according to a quality criterion, giving rise to a second plurality of decode-independent segments; an output bitstream generator capable of generating an output video bitstream comprising a third plurality of decode-independent segments, wherein the output bitstream generator is capable of selecting each segment in the third plurality of decode-independent segments from either the first plurality of decode-independent segments or from the second plurality of decode-independent segments using a selection criterion that is related at least to a segment's bit-rate.

According to an example of the presently disclosed subject matter, there is yet further provided an apparatus, wherein the output bitstream generator is capable of including in the output video bitstream one or more decode-independent segments from the first plurality of decode-independent segments and one or more segments from the second plurality of decode-independent segments.

According to an example of the presently disclosed subject matter, there is yet further provided an apparatus, further comprising a controller, and wherein the encoder is capable of re-encoding each one of the plurality of original decode-independent segments according to a bit-rate criterion, by re-encoding a decode-independent segment from the plurality of original decode-independent segments according to a plurality of different encoder control parameters, giving rise to a first plurality of re-encoded versions of the decode-independent segment, and wherein the encoder is capable of re-encoding each one of the plurality of original decode-independent segments according to a quality criterion, by re-encoding a decode-independent segment from the plurality of original decode-independent segments according to a plurality of different encoder control parameters, giving rise to a second plurality of re-encoded versions of the decode-independent segment, and wherein the controller is capable of selecting from the first plurality of re-encoded versions of the decode-independent segment a version of the decode-independent segment which best matches the bit-rate criterion, and wherein the controller is capable of selecting from the second plurality of re-encoded versions of the decode-independent segment a version of the decode-independent segment which best matches the quality criterion.

According to yet another aspect of the presently disclosed subject matter, there is provided a program storage device readable by machine, tangibly embodying a program of instructions executable by the machine to perform a the methods according to examples of the presently disclosed subject matter.

According to an aspect of the presently disclosed subject matter, there is provided a computer program product comprising a computer useable medium having computer readable program code embodied therein for carrying out the methods according to examples of the presently disclosed subject matter.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 7 is a flowchart illustration of a method according to examples of the presently disclosed subject matter that include an iterative re-encoding of a decode-independent segment, according to examples of the presently disclosed subject matter.

Figure 1:
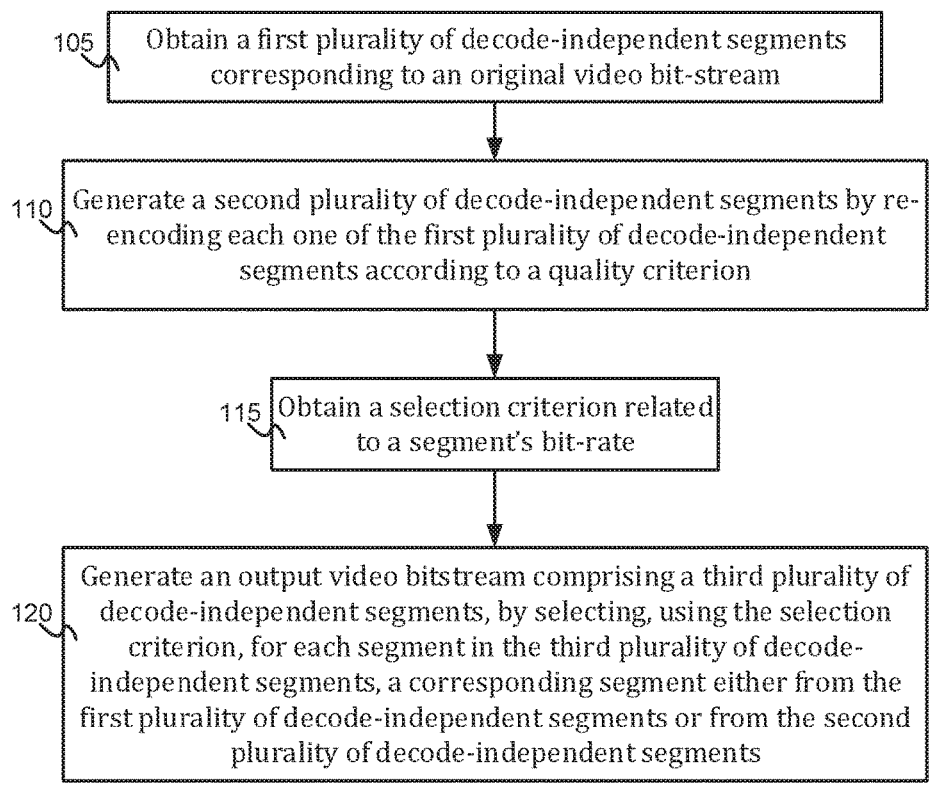
FIG. 1 is a flowchart illustration of a method according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without some of these specific details. In other instances, well-known methods, procedures and components have not been described in detail so as not to obscure the presently disclosed subject matter.

Unless specifically stated otherwise, as apparent from the following discussions, it is appreciated that throughout the specification various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, memory, transmission or display devices.

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

As used herein, the terms "example", "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

The operations in accordance with the teachings herein may be performed by a computer specially constructed for the desired purposes or by a general purpose computer specially configured for the desired purpose by a computer program stored in a tangible computer readable storage medium.

Embodiments of the presently disclosed subject matter are not described with reference to any particular programming language. It will be appreciated that a variety of programming languages may be used to implement the teachings of the presently disclosed subject matter as described herein.

Unless specifically stated otherwise, as apparent from the following discussions, it is appreciated that throughout the specification discussions utilizing terms such as "processing", "obtaining", "utilizing", "determining", "generating", "setting", "configuring", "selecting", "searching", "receiving", "storing", "encoding", "decoding" or the like, include actions and/or processes of a computer that manipulate and/or transform data into other data, said data represented as physical quantities, e.g., such as electronic quantities, and/or said data representing the physical objects. The terms "computer", "processor", and "controller" should be expansively construed to cover any kind of electronic device with data processing capabilities.

Throughout the description and in the claims reference is made to the term "decode-independent segment" or in its plural form "decode-independent segments". The term "decode-independent segment" is referred to in the context of a video bit-stream and is used to relate to a section of a video bit-stream, corresponding to a set of encoded video frames, that can be decoded without requiring any additional information from other bit-stream sections or any additional information corresponding to encoded video frames that are not contained within this set Group of Pictures ("GOP") is an example of a possible decode-independent segment that is used in some video coding formats, such as MPEG-2, H.263, MPEG-4 parts 2 and 10, H.264 and HEVC, where only reference frames within the GOP are used for encoding. Such a GOP is sometimes referred to as a "closed GOP". A GOP can include one or more independently decodable pictures or video frames, which do not require any additional frames for decoding as they do not use reference frames in their coding process. This picture or frame type is sometimes referred to as an "I-picture" (intra-coded picture) or an "I-frame" Typically, a GOP begins with an I-picture. Further by way of example, other types of pictures which may be included in a GOP are: P-picture (predictive coded picture) or P-frame, which contains motion-compensated difference information from previously encoded I-frame(s) or P-frame(s); B-picture (bi-directionally predictive coded picture) or B-frame, which contains difference information from previously encoded I, P or B frames. Note that encoding order may differ from the display or temporal order of the frames, so that for instance a B-frame may use "future" frames as references for the differential coding. For a GOP to be a decode-independent segment all frames used as references for differential coding must be contained within the GOP. In the H.264 standard, segmentation to decode-independent segments can be achieved by starting each decode-independent segment with an Instantaneous Data Refresh ("IDR") frame.

Throughout the description and in the claims reference is made to the term "original video bit-stream". The term "original video bit-stream" is used herein to relate to a video bit-stream before any decoding and re-encoding is carried out as part of implementing embodiments of the present invention. By way of example, an original video bit-stream is the encoded video bit-stream that is provided as input to the apparatus according to examples of the presently disclosed subject matter, or an original video bit-stream is the encoded video bit-stream that is provided as input for the process according to examples of the presently disclosed subject matter.

Throughout the description and in the claims reference is made to the term "original decode-independent segments" and to the similar term "plurality of original decode-independent segments". The terms "original decode-independent segments" and "plurality of original decode-independent segments" are used herein to relate to decode-independent segments or a plurality of decode-independent segments from the original video bitstream.

Throughout the description and in the claims reference is made to the term "quality criterion". The term "quality criterion" is used herein to relate to a computable measure which provides an indication of video content quality. Such a measure receives as input a target image or video frame or a sequence of target video frames, and optionally also receives as input a corresponding reference image or video frame or a corresponding sequence of reference video frames, and uses various metrics to calculate a quality for the target frame or target frame sequence. Good quality measures will provide quality scores that correlate well with subjective quality evaluation of the same content. Some quality measures support the option to indicate when the target and reference content are perceptually identical, using an appropriate threshold. Many such quality scores have been proposed and can be used as part of examples of the presently disclosed subject matter. Examples of quality measure include the four methods described in ITU-T recommendation J.247, the structural Similarity or SSIM index proposed in Z. Wang et. al. "Image quality assessment: From error visibility to structural similarity," IEEE Transactions on Image Processing, vol. 13, no. 4, pp. 600-612, April 2004, the Motion-based Video Integrity Evaluation (MOVIE)

measure proposed in K. Seshadrinathan and A. C. Bovik, "Motion Tuned Spatio-temporal Quality Assessment of Natural Videos", *IEEE Transactions on Image Processing*, vol. 19, no. 2, pp. 335-350, February 2010, and the Block Based Coding Quality proposed in PCT Application Publication No. WO2013/030833 entitled "Controlling a video content system". Examples of quality criteria, one or some of which (or all) can possibly be included in the quality criterion, are described herein.

Throughout the description and in the claims reference is made to the term "bit-rate criterion". The term "bit-rate criterion" is used herein to relate to a criterion related to the bit consumption of an obtained bit-stream, indicating the number of bits corresponding to a pre-determined time unit. For instance, if the video frame rate is 30 frames per second, and 1000 bits are required to represent a given 30 frames, the bit-rate will be 1000 bits per second for that interval. This bit-rate usually fluctuates between frames so a bit-rate criterion may further refer to both the bits corresponding to one set of time units, and also to the bit-rate fluctuations in a second set of shorter time units. For instance a bit consumption over one second intervals may be required that does not exceed X bits, but also require that the bit consumption for each 100 milliseconds does not exceed Y bits, where Y is larger than X/10. Bit rate criteria may refer to maximal bit-rates or minimal bit-rates or a combination yielding a target bit-rate range. Examples of bit-rate criteria, one or some of which (or all) can possibly be included in the bit-rate criterion, are described herein.

Reference is now made to FIG. 1, which is a flowchart illustration of a method according to examples of the presently disclosed subject matter. According to examples of the presently disclosed subject matter, initially, a first plurality of decode-independent segments corresponding to an original video bit-stream can be obtained (block 105).

According to examples of the presently disclosed subject matter, a second plurality of decode-independent segments can be generated by re-encoding each one of the first plurality of decode-independent segments according to a quality criterion (block 110).

Still further according to examples of the presently disclosed subject matter, a selection criterion, which is related to a segment's bit-rate can be obtained (block 115), and an output video bit-stream that includes a third plurality of decode-independent segments can be generated by selecting, using the selection criterion, for each segment in the third plurality of decode-independent segments, a corresponding segment either from the first plurality of decode-independent segments or from the second plurality of decode-independent segments (block 120). Further details with respect to various examples of the presently disclosed subject matter, shall now be provided.

Figure 2:
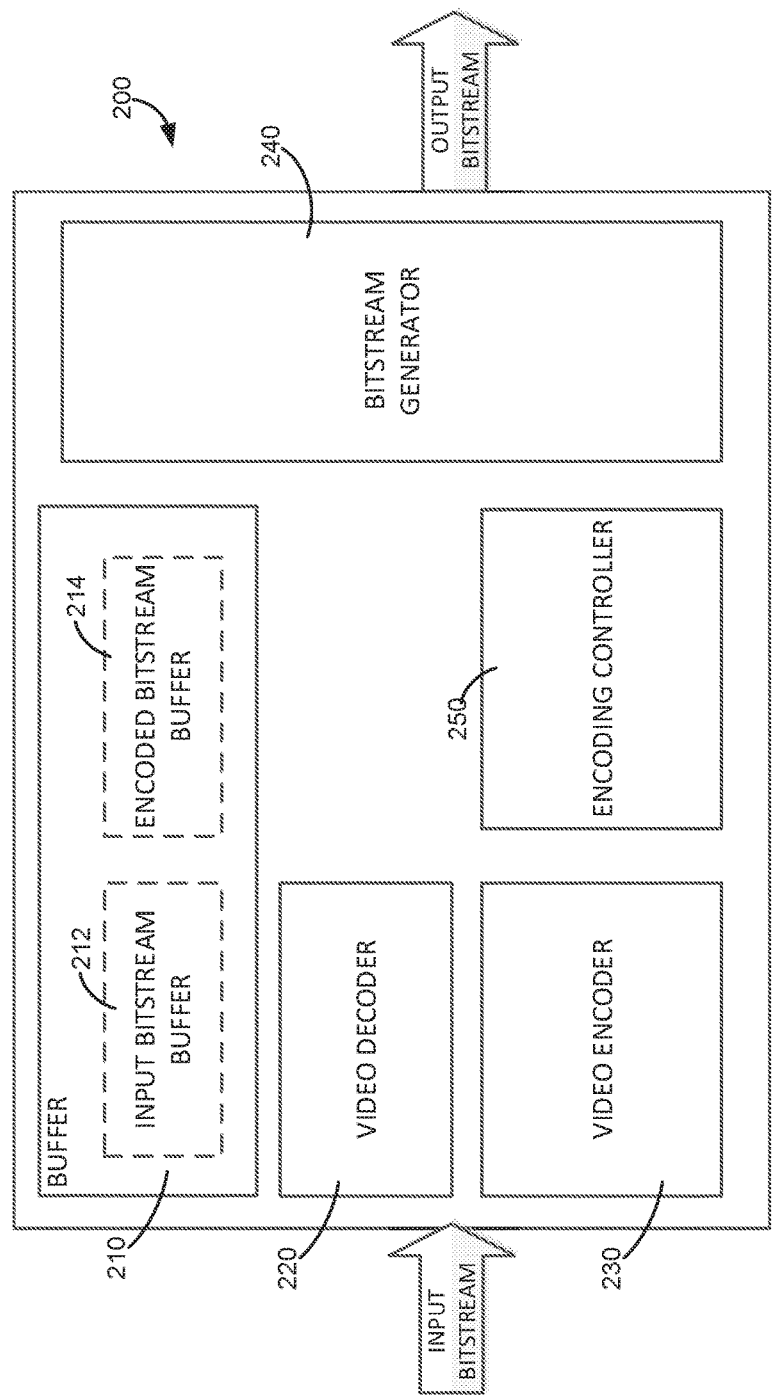
FIG. 2 is a block diagram of an apparatus according to examples of the presently disclosed subject matter.

Reference is now made to FIG. 2, which is a block diagram of an apparatus according to examples of the presently disclosed subject matter. According to examples of the presently disclosed subject matter, the apparatus 200 can include a decoder 220, an encoder 230 and an output bitstream generator 240.

In examples of the presently disclosed subject matter, the apparatus 200 can also include a buffer 210, which in turn can optionally comprise an input bitstream buffer 212 and an encoded bitstream buffer 214, although the two buffers can be implemented using a single buffer with different areas allocated to each of the input bitstream and the encoded bit-stream.

According to examples of the presently disclosed subject matter, the apparatus can further include an encoding controller 250, which is capable of controlling various aspects of the operation of the video encoder 230, and of the encoding operation that is implemented in the video encoder 230.

It would be appreciated that the apparatus 200 can be implemented as a distributed system, with different components residing on different inter-connected machines, and possibly with a component or a plurality of components distributed across a plurality of machines.

Figure 3:
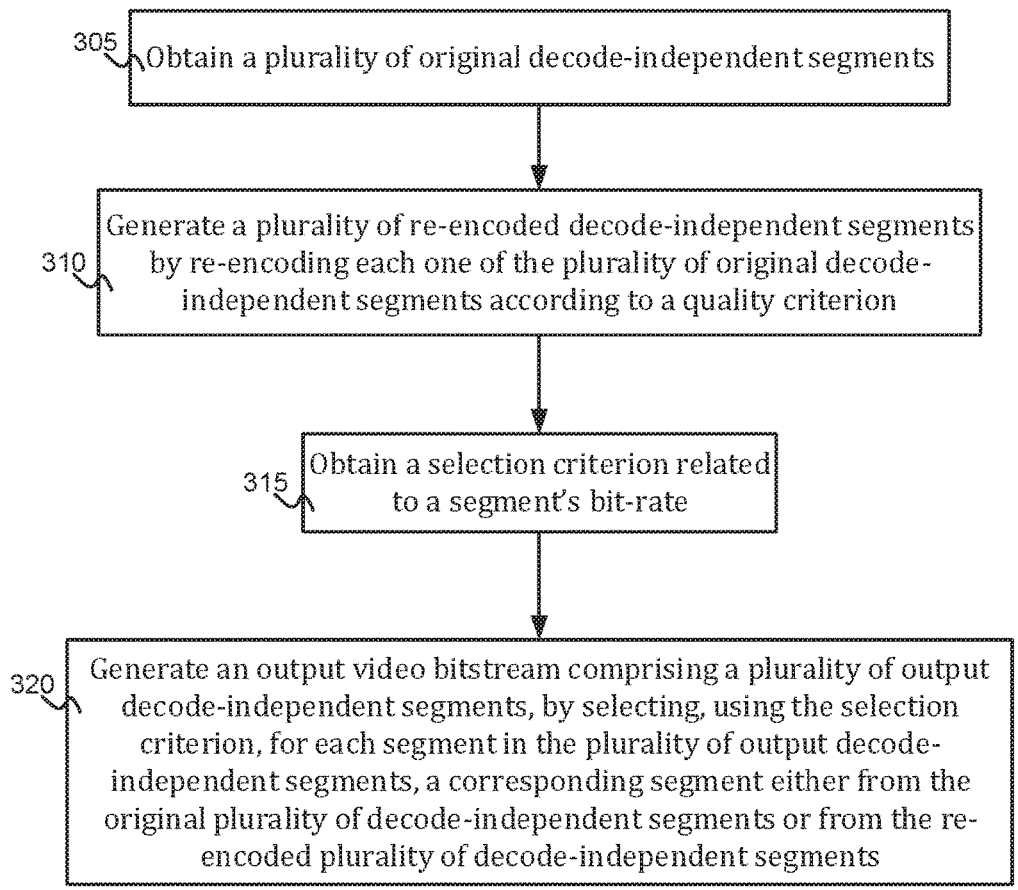
FIG. 3 is a flow chart illustration of a method in accordance with examples of the presently disclosed subject matter.

Additional reference is made to FIG. 3, which is a flow chart illustration of a method in accordance with examples of the presently disclosed subject matter. In some examples of the presently disclosed subject matter, the method that is illustrated in FIG. 3 and described herein with reference thereto can be implemented using the apparatus that is illustrated in FIG. 2 and described herein with reference thereto, but it is not limited to this implementation. According to examples of the presently disclosed subject matter, a plurality of original decode-independent segments can be obtained (block 305). According to examples of the presently disclosed subject matter, an original video bit-stream can be provided as input to apparatus 200. The original video bit-stream can be temporarily stored in the buffer 210, or in the input bitstream buffer 212.

The original video bit-stream or some part thereof can be decoded by the video decoder 220. A plurality of re-encoded decode-independent segments can be generated by re-encoding each one of the plurality of original decode-independent segments according to a quality criterion (block 310). By way of example, decoded original decode-independent segments can be provided as input to the video encoder 230, which can be capable of re-encoding the plurality of original decode-independent segments according to a quality criterion, giving rise to a plurality of re-encoded decode-independent segments. By way of example, the plurality of re-encoded decode-independent segments can be temporarily stored in the buffer 210, or in the encoded bit-stream buffer 214.

Throughout the description and in the claims reference is made to the terms "re-encoding a plurality of decode-independent segments according to a quality criterion", "re-encoding a decode-independent segment according to a quality criterion" or the like. Such terms are used herein to describe a process of encoding one (in case of a discrete decode-independent segment) or more decode-independent segments according to a certain quality criterion.

One example of a quality criterion which can be used in the re-encoding operation can be a perceptual quality measure. By way of example, the quality criterion can require a minimal level of quality as determined by a certain pre-defined perceptual quality measure or by a group of perceptual similarity quality measures. Further by way of example, a perceptual quality measure can define a target (e.g., a minimal or a maximal) level of perceptual similarity. In other words, in such an example, the quality criterion can set forth a certain level of perceptual similarity, and the re-encoding operation can be configured to provide a re-encoded decode-independent segment whose visual appearance, relative to the decode-independent segment that is used as input in the re-encoding operation, is above (or below) the target level of perceptual similarity. In one example the quality criterion can include a requirement that a re-encoded decode-independent segment is perceptually identical (i.e., the quality measure score is above a certain value) to the decode-independent segment which was provided as input of the re-encoding operation.

According to examples of the presently disclosed subject matter, the same quality criterion can be used for all decode-independent segments of an input video stream or in further examples, different quality criteria can be used for different decode-independent segments of an input video stream. In case different quality criteria can be used for different decode-independent segments of an input video stream, the quality criterion for a given decode-independent segment can be manually set by an operator, or can be selected or computed. By way of example the quality criterion for a given decode-independent segment can be determined according to a type classification of the decode-independent segment, for instance according to the segment characteristics, such as level of motion, or according to its location in the video clip. Further by way of example, a higher quality requirement can be used for the clip start. Still further by way of example, different quality requirements can be used according to system level behavior, for instance indications that a segment is being viewed by many users and therefore should be re-encoded using a higher target quality.

Further by way of example, the encoding to a target quality can be performed using the Beamr Video encoder controller developed by ICVT Ltd. from Tel Aviv, Israel, which is based on a Block Based Coding Quality proposed in PCT Application Publication No. WO2013/030833 entitled "Controlling a video content system". Further by way of example, the encoding to a target quality can be performed by using any video encoder that supports a constant quality encoding mode, such as x264 Constant Quality (CQ), or x264 Constant Rate Factor (CRF), followed by computing a quality measure to validate the quality of the encoded video stream.

The term "re-encoding" is used to indicate that the encoding operation is applied to decode-independent segments which originate from an encoded bit-stream, which was decoded for the purpose of being re-encoded using the quality criterion.

By way of example, the re-encoding operation can be carried out by video encoder 230. According to examples of the presently disclosed subject matter, the quality criterion can be provided by the encoding controller 250, and can be used to configure the re-encoding operation that is implemented in the video encoder 230.

According to examples of the presently disclosed subject matter, the plurality of re-encoded decode-independent segments can be temporarily stored in the buffer 210, and in case there is a dedicated encoded bit-stream buffer 214, the plurality of re-encoded decode-independent segments can be temporarily stored there.

Continuing now with the description of FIG. 3, according to examples of the presently disclosed subject matter, at block 315, a selection criterion can be obtained, where the selection criterion can be related to a segment's bit-rate (block 315). An output video bit-stream can then be generated. The output video bit-stream can be comprised of a plurality of decode-independent segments, where each one of the plurality of decode-independent segments in the output video bit-stream is a decode-independent segment that is selected either from the plurality of original decode independent segments or from the plurality of re-encoded decode-independent segments, and the selection is made according to the selection criterion (block 320).

According to examples of the presently disclosed subject matter, the bit-stream generator 240 can be capable of selecting which decode-independent segment is to be selected for the output video bit-stream. Still further by way of example, the plurality of original decode independent segments and the plurality of re-encoded decode-independent segments can be indexed, and as part of the selection operation, the bit-stream generator can process pairs of decode-independent segments with corresponding indices, one from the plurality of original decode independent segments and a corresponding one from the plurality of re-encoded decode-independent segments, using the selection criterion, to determine which one of the pair is to be include in the output video bit-stream.

In one example of a selection criterion according to the presently disclosed subject matter, the bit-stream generator 240, implementing the selection criterion, can be capable of choosing from among each one of the pairs of decode-independent segments, the decode-independent segment versions which provide a minimal perceptual quality while never exceeding a certain pre-determined target bit-rate. Thus for example, if in a certain pair of decode-independent segments the re-encoded decode-independent segment is sufficiently similar (e.g., according to the quality criterion) to the original decode-independent segment, but has a lower bit-rate, the re-encoded decode-independent segment would be selected over the original decode-independent segment.

As will be discussed below, in some examples of the presently disclosed subject matter, several re-encoded decode-independent segment versions can be generated, and the selection criterion can be used, for example, for selecting a decode-independent segment for the output video bit-stream from among all the versions of a given decode-independent segment. For example, the selection criterion can be capable of choosing from among all the versions of a given decode-independent segment (e.g., including the original decode-independent segment and all the re-encoded versions thereof) the one which provides a target perceptual quality (e.g., perceptual identity with the original decode-independent segment) with a bit-rate that meets a target bit-rate. An example of a target perceptual quality can be a perceptual identity with the original decode-independent segment. An example of a target bit-rate can be a bit-rate that is under (or is equal or less than) the bit-rate of the original decode-independent segment. Another example of a target bit-rate can be a bit-rate that is the lowest among the versions which meet the target perceptual quality.

Figure 4:
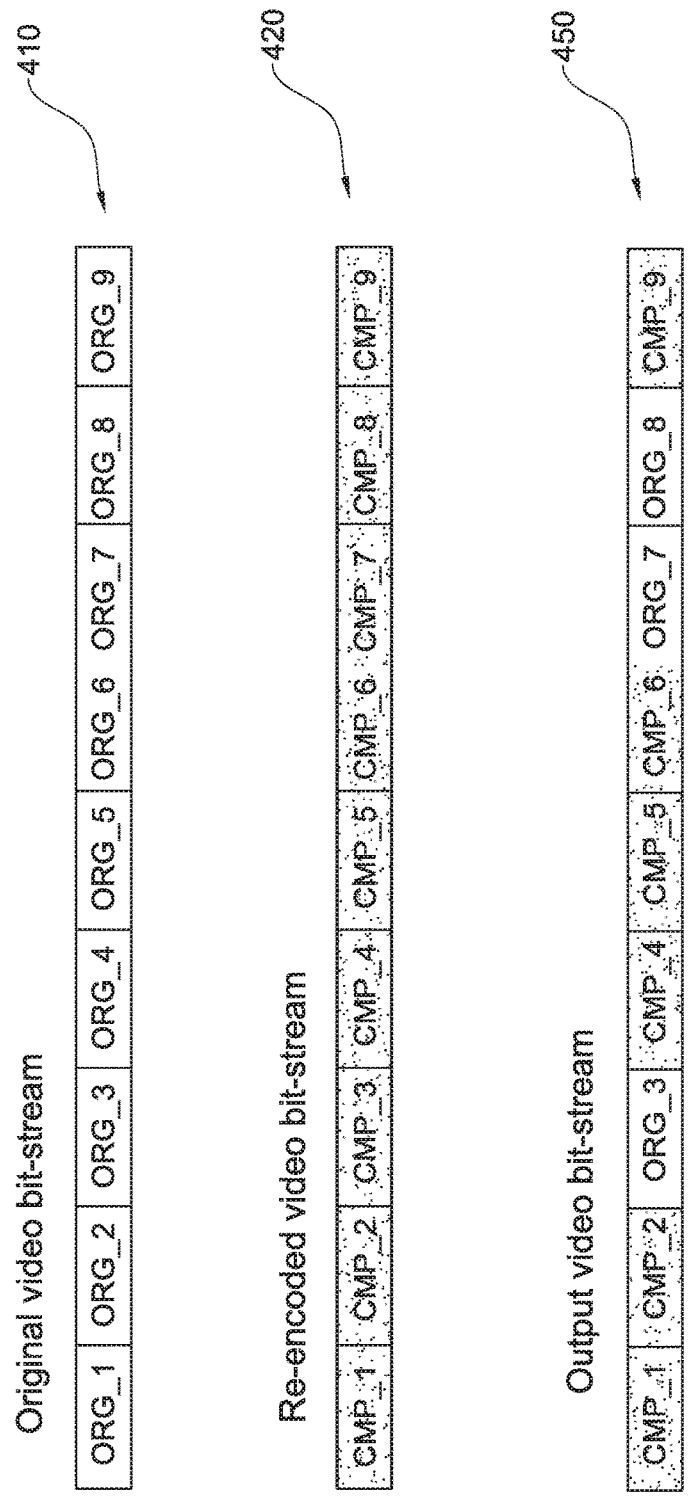
FIG. 4 is a graphical illustration of video output bit-stream, an input bit-stream and re-encoded decode-independent segments, according to examples of the presently disclosed subject matter.

According to examples of the presently disclosed subject matter, the output video bit-stream can thus include one or more decode-independent segments from the original video bit-stream and one or more segments from the plurality of re-encoded decode-independent segments. For illustration, reference is made to FIG. 4, which is a graphical illustration of video output bit-stream, an input bit-stream and re-encoded decode-independent segments, according to examples of the presently disclosed subject matter. The original video bit-stream is comprised of a plurality of original decode-independent segments 410. The output video bit stream is comprised of a plurality of output decode-independent segments 450. The output video bit-stream is comprised of decode-independent segments which were selected either from the original decode-independent segments 410 or from the re-encoded decode-independent segments 420.

Thus far, reference to examples of the presently disclosed subject matter in which the selection of a decode-independent segment for the output video bit-stream was made between a re-encoded decode-independent segment on the one hand, and a respective original decode-independent segment on the other. Now, there is provided a description of examples of the presently disclosed subject matter where the selection of a decode-independent segment for the output video bit-stream involves selection among two or more different re-encoded decode-independent segment versions, and possibly also among two or more different re-encoded decode-independent segment versions, and also among the respective original decode-independent segments.

Figure 5:
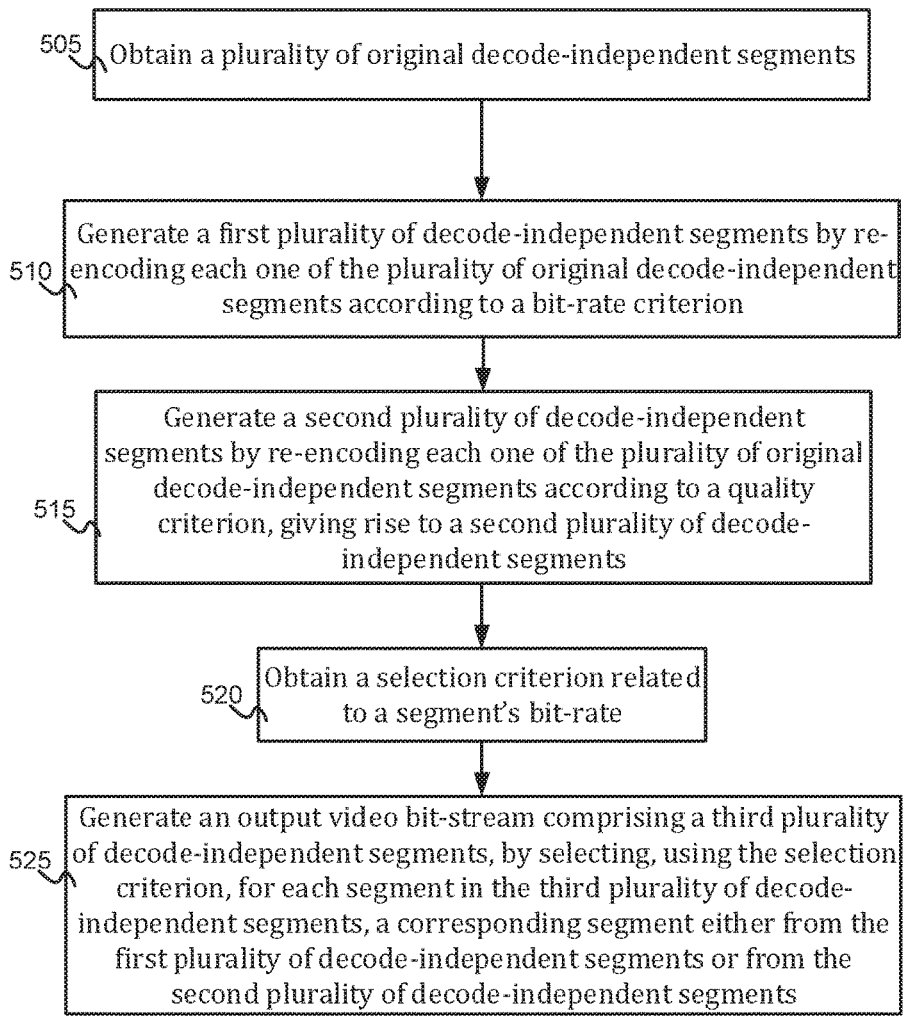
FIG. 5 is a flowchart illustration of a method in accordance with examples of the presently disclosed subject matter.

Reference is thus made to FIG. 5, which is a flowchart illustration of a method in accordance with examples of the presently disclosed subject matter. According to examples of the presently disclosed subject matter, at block 505 a plurality of original decode-independent segments can be obtained. As mentioned above, a plurality of original decode-independent segments are segments from an original video bit-stream, which can be the video-bit stream that was provided as input to the process according to examples of the presently disclosed subject matter, before any decoding and re-encoding was carried out as part of implementing embodiments of the present invention.

According to examples of the presently disclosed subject matter, a first plurality of re-encoded decode-independent segments can be generated by re-encoding each one of the plurality of original decode-independent segments according to a bit-rate criterion (block 510).

By way of example, decoded original decode-independent segments can be provided as input to the video encoder 230, which can be capable of re-encoding the plurality of original decode-independent segments according to a bit-rate criterion, giving rise to a first plurality of re-encoded decode-independent segments. By way of example, the first plurality of re-encoded decode-independent segments can be temporarily stored in the buffer 210, or in the encoded bit-stream buffer 214.

Throughout the description and in the claims reference is made to the terms "re-encoding a plurality of decode-independent segments according to a bit-rate criterion", "re-encoding a decode-independent segment according to a bit-rate criterion" or the like. Such terms are used herein to describe a process of encoding one (in case of a discrete decode-independent segment) or more decode-independent segments according to a certain bit-rate criterion.

One example of a bit-rate criterion which can be used in the re-encoding operation can be a bit-rate threshold, and each re-encoded decode-independent segment that is encoded according to the bit-rate criterion must have a bit-rate that is lower than the bit-rate threshold that is set by the bit-rate criterion. Furthermore encoding to a target bit-rate criterion may imply restrictions both on average bit-rate and also on allowed fluctuations around that bit-rate. An example of encoding according to bit rate criterion may involve encoding to meet the constraints of a target Video Buffering Verification (VBV) model.

According to examples of the presently disclosed subject matter, the same bit-rate criterion can be used for all decode-independent segments of an input video stream or in further examples, different bit-rate criteria can be used for different decode-independent segments of an input video stream. In case different bit-rate criteria can be used for different decode-independent segments of an input video stream the bit-rate criterion for a given decode-independent segment can be manually set by an operator, or can be selected or computed. By way of example the bit-rate criterion for a given decode-independent segment can be determined according to a type classification of the decode-independent segment, for instance according to the segment characteristics, such as the temporal-spatial complexity of the scene, or possibly according to specific system configuration, such as configuring to different bit rates when signaling from a system client indicates lower bit-rates are required, or higher bandwidth is available.

Resuming now the description of FIG. 5, according to examples of the presently disclosed subject matter, a second plurality of re-encoded decode-independent segments can be obtained by re-encoding each one of the plurality of original decode-independent segments according to a quality criterion (block 515). The second plurality of re-encoded decode independent segments can be generated according to any of the examples of the presently disclosed subject matter, which relate to re-encoding decode independent segment(s) according to a quality criterion, including those which were described above with reference to block 310. The quality of the decode-independent segments in the second plurality of decode-independent segments can be evaluated against original decode-independent segments from the original video bit-stream or against re-encoded decode-independent segments from the first plurality of decode-independent segments.

According to examples of the presently disclosed subject matter, the same video encoder 230 can be used for encoding both the first and the second decode-independent segments, or in a further example, the apparatus can have an additional video encoder, and each of the first and the second decode-independent segments can be encoded by a separate encoder. Similarly, the apparatus can have a single encoded bit-stream buffer 214 in which the first and the second decode-independent segments are stored (possibly in separate areas of the memory array) or two separate buffers, a separate one for each of the first and the second decode-independent segments.

A selection criterion related to a segment's bit-rate can be obtained (block 520), and an output video bit-stream can be generated, where the output bit-stream comprises a third plurality of decode-independent segments, and where each decode-independent segment from the third plurality of decode-independent segments is selected, using the selection criterion, either from the first plurality of decode-independent segments or from the second plurality of decode-independent segments.

According to examples of the presently disclosed subject matter, the selection criterion can be as follows: for each decode-independent segment from the third plurality of decode-independent segments, if the bit consumption of a respective decode-independent segment from the second plurality of decode-independent segments is below the bit consumption of a corresponding decode-independent segment from the first decode-independent segments, select the decode-independent segment from the second plurality of decode-independent segments, otherwise use the decode-independent segment from the first plurality of decode-independent segments.

In another example according to the presently disclosed subject matter, the selection criterion can be as follows: for each decode-independent segment from the third plurality of decode-independent segments, if the bit consumption of a respective decode-independent segment from the second plurality of decode-independent segments meets a bit-rate criterion, select the decode-independent segment from the second plurality of decode-independent segments, otherwise use the decode-independent segment from the first plurality of decode-independent segments. It would be appreciated that according to examples of the presently disclosed subject matter, the bit-rate criterion that is used as part of the selection criterion is not necessarily the same as the bit-rate criterion that is used in the encoding of the first plurality of decode-independent segments. Thus, for example, a decode-independent segment from the second plurality of decode-independent segments can sometimes be selected, even when the bit consumption of the decode-independent segment from the second plurality of decode-independent segments is not below a bit-rate of a corresponding segment from the first plurality of decode-independent segments.

Figure 6:
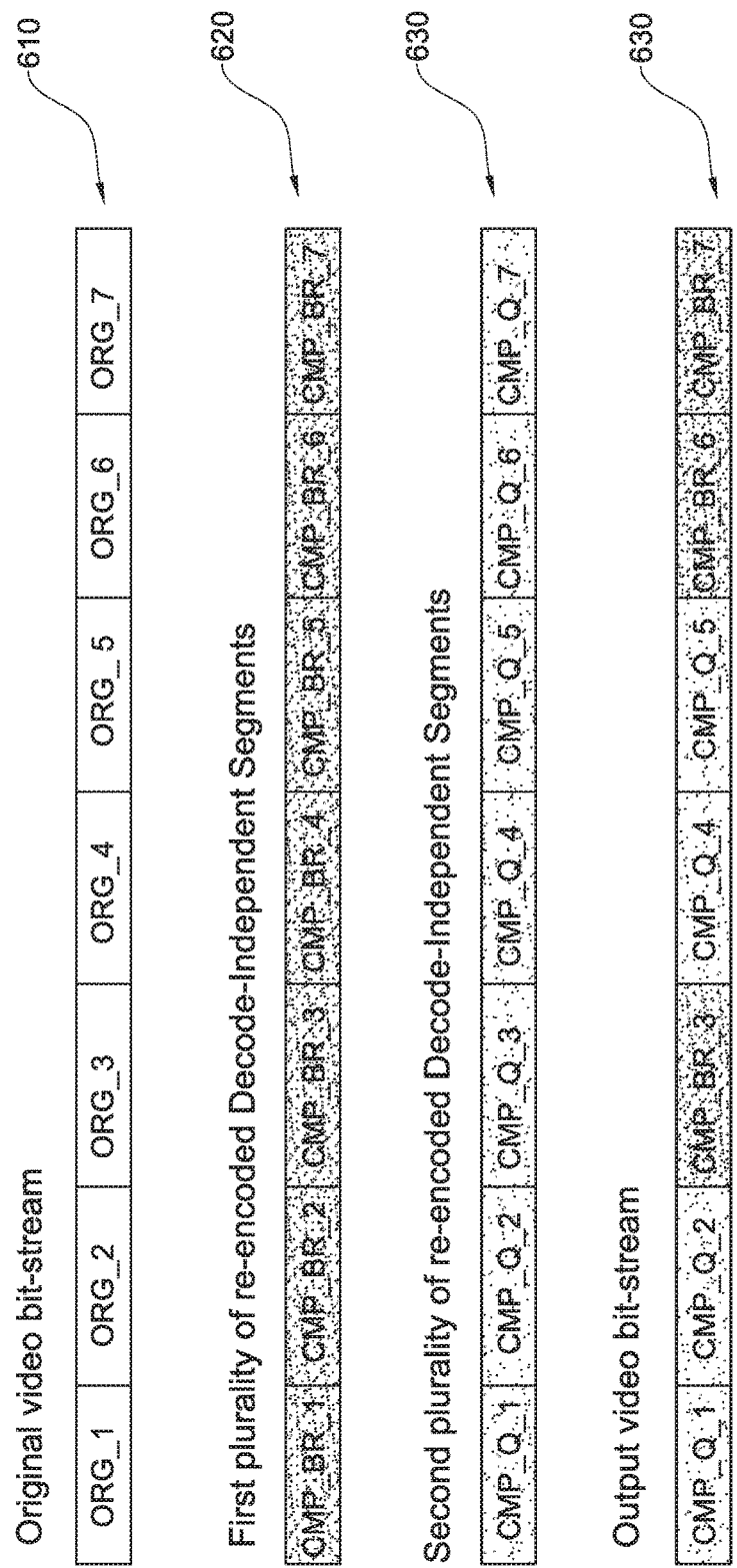
FIG. 6 is a graphical illustration of video output bit-stream, an input bit-stream, a first plurality of re-encoded decode-independent segments and a second plurality of re-encoded decode-independent segments, according to examples of the presently disclosed subject matter.

According to examples of the presently disclosed subject matter, the output video bit-stream can thus include one or more re-encoded decode-independent segments from the first plurality of decode-independent segments and one or more re-encoded decode-independent segments from the second plurality of re-encoded decode-independent segments. For illustration, reference is made to FIG. 6, which is a graphical illustration of video output bit-stream, an input bit-stream, a first plurality of re-encoded decode-independent segments and a second plurality of re-encoded decode-independent segments, according to examples of the presently disclosed subject matter. The original video bit-stream is comprised of a plurality of original decode-independent segments 610. The output video bit stream is comprised of a plurality of output decode-independent segments 650. The output video bit-stream is comprised of decode-independent segments which were selected either from the first plurality of decode-independent segments 620 or from the second plurality of decode-independent segments 630.

According to examples of the presently disclosed subject matter, the process of generating the plurality of re-encoded decode-independent segments (in all its variants and based on all of the various criteria, as described herein) can be carried out one segment at a time. Further by way of example, the process of generating the plurality of re-encoded decode-independent segments can be carried out one segment at a time, and for each one of the plurality of decode-independent segments, the process can include an iterative search for a re-encoded decode-independent segment version of the respective decode-independent segment that is to be used in the set of plurality of re-encoded decode-independent segments, which can be, for example, fed to the bitstream generator 240.

Reference is now made by way of example to FIG. 7, which is a flowchart illustration of a method according to examples of the presently disclosed subject matter that include an iterative re-encoding of a decode-independent segment, according to examples of the presently disclosed subject matter. It would be appreciated that there are various iterative search implementations which can be used as part of examples of the presently disclosed subject matter, and that the iterative search implementation which is shown in FIG. 7 and described here, is merely one example of various possible implementations of such an iterative search.

According to examples of the presently disclosed subject matter, a first plurality of decode-independent segments which correspond to an original video bit-stream can be obtained (block 705). According to examples of the presently disclosed subject matter, the first plurality of decode-independent segments can be the actual plurality of decode-independent segments from the original video bit-stream, or in further examples, the first plurality of decode-independent segments can include a plurality of re-encoded decode-independent segments which were generated using a plurality of decode-independent segments from the original video bit-stream. It should be noted, that in case the first plurality of decode-independent segments are re-encoded segments, the iterative search implementation which is now described can also be used to generate the first plurality of decode-independent segments.

According to examples of the presently disclosed subject matter, a decode-independent segment that is to be re-encoded can be selected from the first plurality of decode-independent segments (block 715). By way of example, the re-encoding of the decode-independent segments can be carried out in a sequential order so that the best encoder configuration selected for the last segment may apply well to the next segment which follows it temporally. However, in further examples other ordering schemes can be used in the re-encoding process, such as ordering according to some characteristic, for example, according to average brightness levels. An initial set of encoder control parameters can also be obtained (block 715), and the decode-independent segment from the first plurality of decode-independent segments can be encoded using the encoder control parameters (block 720). For instance, the encoder control parameters can include a set of Quantizer values, or a set of X.264 CRF values. Further by way of example, the encoding parameters can also be related to target bit-rates. Once the iterative process has concluded for one segment, the encoding parameters that were selected for the current decode-independent segment can be used for the first iteration of the following decode-independent segment. In subsequent iterations the encoder parameters can be adapted in an attempt to reach a target By way of example, if the encoder is controlled via a constant QP value, the re-encoding can start with a pre-determined value, say QP=25. Then, if the quality of the re-encoded decode-independent segment was found to exceed a target quality, the QP value can be increased, say to 35, and then run a further iteration of the re-encoding process. If the obtained quality is then below the target quality, the QP value can be set to 30 and a further iteration of the re-encoding process can be carried out, and so forth.

According to examples of the presently disclosed subject matter, following each iteration of the decode-independent segment re-encoding process, a process control criterion can be evaluated to determine whether an additional iteration of the re-encoding process is required (block 725). As would be appreciated, various process control criteria can be used, including for example, a predefined number of iterations, a divergence criterion which can be used in combination with a quality or bit-rate criterion. By way of example, a range may be set for the target quality and the iterations used to perform an efficient search over possible encoding parameters values, evaluating the obtained quality at the end of each iteration and according to a relation between the obtained quality and the target quality range adapting the encoding parameters values in a way that is expected to provide a quality that is closer to the target quality. By way of example, the iterative process can be configured to terminate either when the quality relation with the target range is satisfactory, or if a maximum number of iterations has been reached.

According to examples of the presently disclosed subject matter, while the process control criterion is not met, additional iterations of the iterative re-encoding process can be implemented, including, for example: updating the encoder control parameters (block 730) and repeating blocks 720 and 725 with respect to the respective new version(s) of the re-encoded decode-independent segment that was generated using the updated encoder control parameters.

According to examples of the presently disclosed subject matter, when a process control criterion is met, indicating that the decode-independent segment re-encoding process has ended, in case more than one re-encoded version of the decode-independent segment was generated by the iterative re-encoding process, a re-encoded version of the decode-independent segment can be selected from the plurality of re-encoded versions that were generated by the iterative re-encoding process (block 735).

Various version selection criteria can be used for selecting a re-encoded version of the decode-independent segment from the plurality of re-encoded versions that were generated by the iterative re-encoding process. In one example, the selected re-encoded version of the decode-independent segment, is the one whose quality is equal to or higher than a target quality, and is associated with the lowest bit-rate among the versions which meet the target quality. Further by way of example, a variant of this version selection criterion can be used for selecting a re-encoded version of the decode-independent segment which is perceptually identical to the original decode-independent segment and is associated with the lowest bit-rate among the versions of the re-encoded decode-independent segments which are perceptually similar to the corresponding original decode-independent segment. In a further example of a version selection criterion, the selected re-encoded version of the decode-independent segment is the re-encoded version from among a plurality of re-encoded versions of the decode-independent segment whose bit-rate is equal to or below a target bit-rate, and which has the highest quality (as evaluated by a pre-defined quality criterion) out of all the versions of the re-encoded decode-independent segment.

It would be appreciated that according to examples of the presently disclosed subject matter, the version selection criterion can be combined with the process control criterion, and once a re-encoded version of the decode-independent segments is generated which is good enough according to the version selection criterion, it is selected and the iterative process is completed.

According to examples of the presently disclosed subject matter, the iterative re-encoding process shown in FIG. 7, and described herein with reference thereto, can be repeated for each decode-independent segment from the first plurality of decode-independent segments. Once a version of the decode-independent segment is selected, an additional selection criterion can be used to select the version of the decode-independent segments that is to be used in the output video bit-stream, as was described above with reference to any one of blocks 120, 320 and 525. Thus, the iterative re-encoding process can be used to create a re-encoded version for each one of a plurality of decode-independent segments. If the output video bit-stream is generated from the original video bit-stream and just one set of re-encoded decode-independent segments, the iterative re-encoding process can be implemented once—for providing the set of re-encoded decode-independent segments that is used in addition to the original video bit-stream. If however, more than one set of re-encoded decode-independent segments is generated for providing the output video-bit stream, the iterative re-encoding process can be implemented separately for each set of re-encoded decode-independent segments and different encoder control parameters and different version selection criterion can be used for each one of the iterative re-encoding processes.

According to some examples, for each decode-independent segment from a plurality of decode-independent segments which are to be re-encoded, the encoder control parameters that are to be used for initializing the re-encoding of the decode-independent segment, are associated with the encoder control parameters that were used to generate the re-encoded version of the previous decode-independent segment that was selected according to the version selection criterion. For example, if the current decode-independent segment is a segment referenced 'X+1', and in the re-encoding process of decode-independent segment 'X' a certain set of encoder control parameters were used to generate the version of the decode-independent segment which was selected as the best version (e.g., it was closest to the version selection criterion), the set of encoder control parameters that were used to generate the selected version of the decode-independent segment 'X' can be initially used to re-encode decode-independent segment 'X+1'. The version of the decode-independent segment 'X+1' shall be evaluated, e.g., using a version selection criterion, and if it meets a target that is set by the version selection criterion, this version is selected and is to be used in the subsequent selection step, in which the version of the decode-independent segment is selected.

It will also be understood that the apparatus according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:
1. A method, comprising:
obtaining a first plurality of decode-independent segments corresponding to an original video bit-stream, wherein the first plurality of decode independent segments are a plurality of original decode-independent segments;
re-encoding each one of the first plurality of decode-independent segments according to a quality criterion, giving rise to a second plurality of decode-independent segments, wherein the quality criterion is a computable quality measure indicative of quality of the second plurality of decode-independent segments relative to the first plurality of decode-independent segments, and wherein the re-encoding comprises calculating a quality score for each one of the second plurality of decode-independent segments in accordance with the quality criterion; and
generating an output video bitstream comprising a third plurality of decode-independent segments, comprising selecting each decode-independent segment in the third plurality of decode-independent segments from either the first plurality of decode-independent segments or from the second plurality of decode-independent segments, as the decode-independent segment that has a lower bit-rate of a corresponding decode-independent segment in the first plurality of decode-independent segments and a corresponding decode-independent segment in the second plurality of decode-independent segments, wherein at least one decode-independent segment in the first plurality of decode-independent segments has a lower bit-rate than at least one corresponding decode-independent segment in the second plurality of decode-independent segments, and at least one decode-independent segment in the third plurality of decode-independent segments is selected as the at least one decode-independent segment in the first plurality of decode-independent segments.

2. The method according to claim 1, wherein re-encoding each one of the first plurality of decode-independent segments, comprises:
re-encoding a decode-independent segment from said first plurality of decode-independent segments according to a plurality of different encoder control parameters, giving rise to a plurality of re-encoded versions of the decode-independent segment; and selecting from the plurality of re-encoded versions of the decode-independent segment a version of the decode-independent segment which best matches the quality criterion.

3. The method according to claim 2, wherein the quality criterion sets a target quality, and wherein selecting from the plurality of re-encoded versions of the decode-independent segment a version of the decode-independent segment, comprises selecting from the plurality of re-encoded versions of the decode-independent segment a version of the decode-independent segment which is closest to the target quality.

4. The method according to claim 2, wherein the quality criterion sets a quality threshold, and wherein selecting from the plurality of re-encoded versions of the decode-independent segment a version of the decode-independent segment, comprises selecting from the plurality of re-encoded versions of the decode-independent segment a version of the decode-independent segment whose bit-rate is lowest among a plurality of re-encoded versions of the decode-independent segment whose quality value meets the quality threshold.

5. The method according to claim 2, wherein the quality criterion is further associated with a bit-rate threshold, and wherein selecting from the plurality of re-encoded versions of the decode-independent segment a version of the decode-independent segment, comprises selecting from the plurality of re-encoded versions of the decode-independent segment a version of the decode-independent segment whose quality value is a highest among the plurality of re-encoded versions of the decode-independent segment whose bit-rate is below the bit-rate threshold.

6. The method according to claim 1, wherein re-encoding each one of the first plurality of decode-independent segments, comprises:

re-encoding a decode-independent segment from said first plurality of decode-independent segments, giving rise to a first re-encoded version of the decode-independent segment; and if a first re-encoded version of the decode-independent segment meets the quality criterion, including the first re-encoded version of the decode-independent segment in the second plurality of decode-independent segments, otherwise, re-encoding the decode-independent segment one or more additional times using respective, different, one or more encoder control parameters, giving rise to one or more additional re-encoded versions of the decode-independent segment, until one of the one or more additional re-encoded versions of the decode-independent segment meets the quality criterion or until a limit provided by a process control criterion is reached.

7. The method according to claim 6, wherein re-encoding a decode-independent segment from said first plurality of decode-independent segments, includes for a first version of a decode-independent segment from said first plurality of decode-independent segments using encoder control parameters that were used to re-encode a previous decode-independent segment from said first plurality of decode-independent segments.

8. A method, comprising:

re-encoding each one of a plurality of original decode-independent segments according to a bit-rate criterion, giving rise to a first plurality of decode-independent segments;

separately re-encoding each one of the plurality of original decode-independent segments according to a quality criterion, giving rise to a second plurality of decode-independent segments, wherein the quality criterion is a computable quality measure indicative of quality of the second plurality of decode-independent segments relative to the first plurality of decode-independent segments, and wherein the re-encoding comprises calculating a quality score for each one of the second plurality of decode-independent segment in accordance with the quality criterion;

generating an output video bitstream comprising a third plurality of decode-independent segments, comprising selecting each decode-independent segment in the third plurality of decode-independent segments from either the first plurality of decode-independent segments or from the second plurality of decode-independent segments as the decode-independent segment that has a lower bit-rate of a corresponding decode-independent segment in the first plurality of decode-independent segments and a corresponding decode-independent segment in the second plurality of decode-independent segments, wherein at least one decode-independent segment in the first plurality of decode-independent segments has a lower bit-rate than at least one corresponding decode-independent segment in the second plurality of decode-independent segments, and at least one decode-independent segment in the third plurality of decode-independent segments is selected as the at least one decode-independent segment in the first plurality of decode-independent segments.

9. An apparatus, comprising:

a decoder configured to decode a first plurality of decode-independent segments corresponding to an original video bit-stream, wherein the first plurality of decode independent segments are a plurality of original decode-independent segments;

an encoder configured to re-encode each one of the first plurality of decode-independent segments according to a quality criterion, giving rise to a second plurality of decode-independent segments, wherein the quality criterion is a computable quality measure indicative of quality of the second plurality of decode-independent segments relative to the first plurality of decode-independent segments, and wherein the re-encoding comprises calculating a quality score for each one of the second plurality of decode-independent segments in accordance with the quality criterion;

an output bitstream generator configured to generate an output video bitstream comprising a third plurality of decode-independent segments by selecting each decode-independent segment in the third plurality of decode-independent segments from either the first plurality of decode-independent segments or from the second plurality of decode-independent segments, as the decode-independent segment that has a lower bit-rate of a corresponding decode-independent segment in the first plurality of decode-independent segments and a corresponding decode-independent segment in the second plurality of decode-independent segments, wherein at least one decode-independent segment in the first plurality of decode-independent segments has a lower bit-rate than at least one corresponding decode-independent segment in the second plurality of decode-independent segments, and at least one decode-independent segment in the third plurality of decode-independent segments is selected as the at least one decode-independent segment in the first plurality of decode-independent segments.

10. The apparatus according to claim 9, wherein the decoder is configured to decode a plurality of original decode-independent segments, and wherein the encoder is configured to re-encode each one of the original decode-independent segments according to a bit-rate criterion, giving rise to the first plurality of decode-independent segments.

11. The apparatus according to claim 9, wherein the encoder is configured to re-encode each one of the first plurality of decode-independent segments, and wherein re-encoding each one of the first plurality of decode-independent segments, comprises:
   re-encoding a decode-independent segment from said first plurality of decode-independent segments according to a plurality of different encoder control parameters, giving rise to a plurality of re-encoded versions of the decode-independent segment; and
   selecting from the plurality of re-encoded versions of the decode-independent segment a version of the decode-independent segment which best matches the quality criterion.

12. The apparatus according to claim 11, wherein the quality criterion sets a target quality, and wherein the encoder is configured to select from the plurality of re-encoded versions of the decode-independent segment a version of the decode-independent segment which is closest to the target quality.

13. The apparatus according to claim 11, wherein the quality criterion sets a quality threshold, and wherein the encoder is configured to select from the plurality of re-encoded versions of the decode-independent segment a version of the decode-independent segment whose bit-rate is lowest among a plurality of re-encoded versions of the decode-independent segment whose quality value meets the quality threshold.

14. The apparatus according to claim 11, wherein the quality criterion is further associated with a bit-rate threshold, and wherein the encoder is configured to select from the plurality of re-encoded versions of the decode-independent segment a version of the decode-independent segment whose quality value is a highest among the plurality of re-encoded versions of the decode-independent segment whose bit-rate is below the bit-rate threshold.

15. The apparatus according to claim 9, wherein the encoder is capable of re-encoding each one of the first plurality of decode-independent segments, by:
   re-encoding a decode-independent segment from said first plurality of decode-independent segments, giving rise to a first re-encoded version of the decode-independent segment; and
   if a first re-encoded version of the decode-independent segment meets the quality criterion, the encoder is configured to include the first re-encoded version of the decode-independent segment in the second plurality of decode-independent segments, otherwise the encoder is configured to re-encode the decode-independent segment one or more additional times using respective, different, one or more encoder control parameters, giving rise to one or more additional re-encoded versions of the decode-independent segment, until one of the one or more additional re-encoded versions of the decode-independent segment meets the quality criterion.

16. The apparatus according to claim 15, for a first version of a decode-independent segment from said first plurality of decode-independent segments the encoder is configured to use encoder control parameters that were used to re-encode a previous decode-independent segment from said first plurality of decode-independent segments.

17. An apparatus, comprising:
   a decoder configured to decode a plurality of original decode-independent segments corresponding to an original video bit-stream;
   an encoder configured to re-encode each one of the plurality of original decode-independent segments according to a bit-rate criterion, giving rise to a first plurality of decode-independent segments;
   the encoder is configured to separately re-encode each one of the plurality of original decode-independent segments according to a quality criterion, giving rise to a second plurality of decode-independent segments, wherein the quality criterion is a computable quality measure indicative of quality of the second plurality of decode-independent segments relative to the first plurality of decode-independent segments, and wherein the re-encoding comprises calculating a quality score for each one of the second plurality of decode-independent segments in accordance with the quality criterion;
   an output bitstream generator configured to generate an output video bitstream comprising a third plurality of decode-independent segments, wherein the output bitstream generator is configured to select each decode-independent segment in the third plurality of decode-independent segments from either the first plurality of decode-independent segments or from the second plurality of decode-independent segments, as the decode-independent segment that has a lower bit-rate of a corresponding decode-independent segment in the first plurality of decode-independent segments and a corresponding decode-independent segment in the second plurality of decode-independent segments, wherein at least one decode-independent segment in the first plurality of decode-independent segments has a lower bit-rate than at least one corresponding decode-independent segment in the second plurality of decode-independent segments, and at least one decode-independent segment in the third plurality of decode-independent segments is selected as the at least one decode-independent segment in the first plurality of decode-independent segments.

18. A program storage device readable by machine, tangibly embodying a program of instructions executable by the machine to perform a method, comprising:
   obtaining a first plurality of decode-independent segments corresponding to an original video bit-stream, wherein the first plurality of decode independent segments are a plurality of original decode-independent segments;
   re-encoding each one of the first plurality of decode-independent segments according to a quality criterion, giving rise to a second plurality of decode-independent segments, wherein the quality criterion is a computable quality measure indicative of quality of the second plurality of decode-independent segments relative to the first plurality of decode-independent segments, and wherein the re-encoding comprises calculating a quality score for each one of the second plurality of decode-independent segments in accordance with the quality criterion; and
   generating an output video bit-stream comprising a third plurality of decode-independent segments, wherein each decode-independent segment in the third plurality of decode-independent segments is selected from either the first plurality of decode-independent segments or from the second plurality of decode-independent segments, as the decode-independent segment that has a lower bit-rate of a corresponding decode-independent segment in the first plurality of decode-independent segments and a corresponding decode-independent segment in the second plurality of decode-independent segments, wherein at least one decode-independent segment in the first plurality of decode-independent segments has a lower bit-rate than at least one corresponding decode-independent segment in the second plurality of decode-independent segments, and at least one decode-independent segment in the third plurality of decode-independent segments is selected as the at least one decode-independent segment in the first plurality of decode-independent segments.

* * * * *